US012793631B2

(12) United States Patent
Kim et al.

(10) Patent No.: US 12,793,631 B2
(45) Date of Patent: Nov. 10, 2026

(54) DISPLAY DEVICE AND A METHOD OF DRIVING THE SAME

(71) Applicant: SAMSUNG DISPLAY CO., LTD., Yongin-si (KR)

(72) Inventors: Hong Soo Kim, Yongin-si (KR); Myung Woo Lee, Yongin-si (KR); Suk Hun Lee, Yongin-si (KR); Jae Keun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/206,252

(22) Filed: Jun. 6, 2023

(65) Prior Publication Data

US 2024/0078974 A1 Mar. 7, 2024

(30) Foreign Application Priority Data

Sep. 7, 2022 (KR) ........................ 10-2022-0113524

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/08* (2013.01); *G09G 2320/0233* (2013.01); *G09G 2320/0247* (2013.01); *G09G 2330/021* (2013.01); *G09G 2330/028* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 10,043,452 | B2 | 8/2018 | Jung et al. | |
| 10,529,283 | B2 | 1/2020 | Chai et al. | |
| 10,540,927 | B2 | 1/2020 | Park et al. | |
| 10,825,382 | B2 | 11/2020 | Kim et al. | |
| 11,462,152 | B2 | 10/2022 | Kim et al. | |
| 2014/0022227 | A1* | 1/2014 | Kim | G09G 3/3208 345/82 |
| 2018/0151109 | A1* | 5/2018 | Shim | G09G 3/32 |
| 2020/0051472 | A1* | 2/2020 | Ju | H10K 71/70 |

(Continued)

FOREIGN PATENT DOCUMENTS

| | | |
|---|---|---|
| KR | 10-2018-0063425 | 6/2018 |
| KR | 10-2018-0091985 | 8/2018 |

(Continued)

*Primary Examiner* — Christopher R Lamb
(74) *Attorney, Agent, or Firm* — F. CHAU & ASSOCIATES, LLC

(57) ABSTRACT

A display device including: a power supply configured to supply a first power, a second power, and a third power to a first power line, a second power line, and a third power line, respectively, wherein each of the first power, the second power and the third power varies in voltage level during one frame period; and pixels connected to at least one of scan lines and data lines, and connected to a common control line, the first power line, the second power line, and the third power line, wherein the pixels simultaneously emit light when the second power is changed to a low level, and a number of times the second power is changed to the low level during the one frame period changes in response to an image refresh rate.

11 Claims, 13 Drawing Sheets

(56) References Cited

U.S. PATENT DOCUMENTS

| | | | | |
|---|---|---|---|---|
| 2020/0395432 | A1 | 12/2020 | Kim et al. | |
| 2021/0027696 | A1* | 1/2021 | Kim | G09G 3/3233 |
| 2021/0126079 | A1* | 4/2021 | Jo | G09G 3/3208 |

FOREIGN PATENT DOCUMENTS

| | | |
|---|---|---|
| KR | 10-2334248 | 12/2021 |
| KR | 10-2022-0014367 | 2/2022 |

* cited by examiner

200: 120, 130, 140, 150

200': 120', 130', 140, 150, 160

<DSP>

<CP>

<CP>

DISPLAY DEVICE AND A METHOD OF DRIVING THE SAME

CROSS-REFERENCE TO RELATED APPLICATION

The present application claims priority under 35 U.S.C. § 119 to Korean patent application number 10-2022-0113524 filed on Sep. 7, 2022, the disclosure of which is incorporated by reference herein in its entirety.

TECHNICAL FIELD

Various embodiments of the present disclosure relate to a display device and a method of driving the display device.

DESCRIPTION OF RELATED ART

A display device is an output device for presentation of information in visual form. The display device may display images in a successive emission scheme in which pixels successively emit light on a pixel row basis, or in a simultaneous emission scheme in which all pixels simultaneously emit light after successive data writes have been completed.

The display device may be driven, to reduce power consumption, at a low frequency less than 60 Hz in the case where a static image or the like is displayed. However, in the simultaneous emission scheme, when an image refresh rate of the display device is changed to a low frequency or a high frequency, a flicker or the like may be visible.

SUMMARY

Various embodiments of the present disclosure are directed to a display device capable of preventing a flicker or the like from being visible when an Image refresh rate is changed in a simultaneous emission scheme, and a method of driving the display device.

An embodiment of the present disclosure may provide a display device including: a power supply configured to supply a first power, a second power, and a third power to a first power line, a second power line, and a third power line, respectively, wherein each of the first power, the second power and the third power varies in voltage level during one frame period; and pixels connected to at least one of scan lines and data lines, and connected to a common control line, the first power line, the second power line, and the third power line, wherein the pixels simultaneously emit light when the second power is changed to a low level, and a number of times the second power is changed to the low level during the one frame period changes in response to an image refresh rate.

As the image refresh rate is reduced, the number of times the second power is changed to the low level is increased.

In response to the number of times the second power is changed to the low level during the one frame period increases, a low level voltage of the second power is gradually reduced.

In response to the number of times the second power is changed to the low level during the one frame period increases, a low level voltage of the second power is gradually increased.

In response to the number of times the second power is changed to the low level during the one frame period increases, a low-level-voltage supply time of the second power is gradually reduced.

In response to the number of times the second power is changed to the low level during the one frame period increases, a low-level-voltage supply time of the second power is gradually increased.

Each of the pixels includes a driving transistor configured to control a current to be supplied to a light emitting element, and one frame period includes a display scan period, the display scan period including: a first non-emission section including a first initialization section in which the driving transistor is initialized, a second initialization section in which an anode electrode of the light emitting element is initialized, a threshold voltage compensation section in which a threshold voltage of the driving transistor is compensated for, and a data write section in which a data signal is written in the pixels; and a first emission section in which the pixels simultaneously emit light.

The one frame period includes at least one control period in response to a frequency of the image refresh rate, the control period includes: a second non-emission section in which the pixels do not emit light; and a second emission section in which the pixels simultaneously emit light.

When the image refresh rate is reduced, a number of control periods included in the one frame period is increased.

A width of the second emission section is gradually increased or reduced in proportion to the number of control periods included in the one frame period.

Each of the pixels includes; a light emitting element connected between a second node and the second power line; a driving transistor connected between the first power line and the second node, and including a gate electrode connected to a first node; a second capacitor connected between the third power line and the first node; a second transistor connected between the first node and the second node, and including a gate electrode connected to an i-th scan line (where i is a natural number); a third transistor connected between a third node and the second node, and including a gate electrode connected to the common control line; and a first capacitor connected between the third node and a j-th scan line (where j is a natural number).

An embodiment of the present disclosure may provide a method of driving a display device in which pixels are driven during one frame period using a voltage level of a second power supplied to a cathode electrode of a light emitting element included in each of the pixels, the method including: writing a voltage of a data signal in each of the pixels during a first non-emission section of a display scan period of the one frame period, and simultaneously emitting light from the pixels during a first emission section of the one frame period; and maintaining the voltage of the data signal supplied in a preceding period during a second non-emission section of a control period of the one frame period, and simultaneously emitting light from the pixels during a second emission section of the one frame period.

A number of control periods included in the one frame period is changed in response to an image refresh rate.

In a case where the image refresh rate is reduced, the number of control periods included in the one frame period is increased.

During each of a first emission section of the display scan period and a second emission section of the control period, the second power is set to a voltage of a low level, and the low level voltage of the second power supplied during the second emission section of the control period is set to be different from the low level voltage of the second power supplied during the first emission section of the display scan period.

The low level voltage of the second power is set to gradually decrease or increase in response to an increase of the control period included in the one frame period.

During a first emission section of the display scan period and a second emission section of the control period, the second power is set to a voltage of a low level, and during the second emission section of the control period, the low level voltage of the second power is supplied for a first time, and during the first emission section of the display scan period, the low level voltage of the second power is supplied for a second time different from the first time.

A low-level-voltage supply time of the second power is set to be gradually increased or reduced in response to an increase of the control period included in the one frame period.

An embodiment of the present disclosure may provide a display device including: a power supply configured to supply a first power, a second power, and a third power to a first power line, a second power line, and a third power line, respectively, wherein each of the first power, the second power and the third power varies in voltage level during one frame period; and pixels connected to at least one of scan lines and data lines, and connected to a common control line, the first power line, the second power line, and the third power line, wherein the pixels simultaneously emit light when the second power is changed to a low level after a control period within the one frame period, and a number of control periods in the one frame period is based on an mage refresh rate.

When the image refresh rate is reduced, the number of control periods included in the one frame period is increased.

DETAILED DESCRIPTION OF THE EMBODIMENTS

Figure 1:
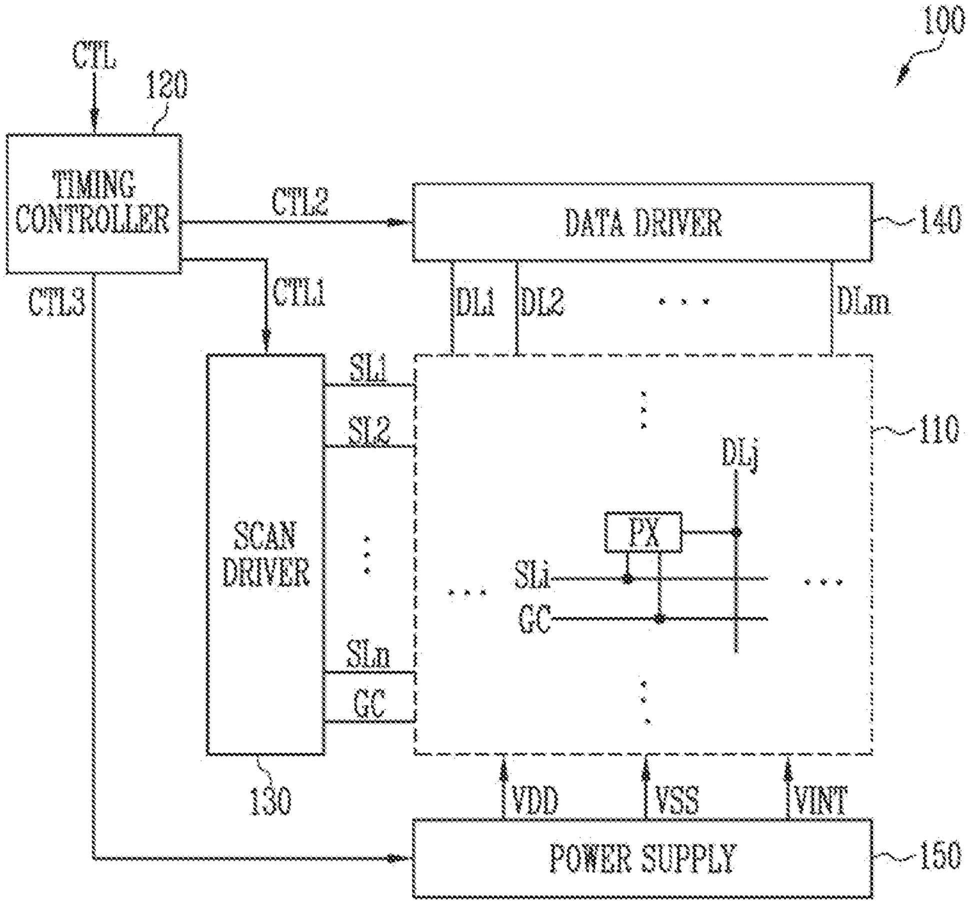
FIG. 1 is a diagram illustrating a display device in accordance with an embodiment of the present disclosure.

Hereinafter, embodiments of the present disclosure will be described in detail with reference to the attached drawings, such that those skilled in the art can easily implement the present disclosure. The present disclosure may be implemented in various forms, and is not limited to the embodiments to be described herein below.

In the drawings, portions which are not related to the present disclosure will be omitted in order to explain the present disclosure more clearly. In this specification, similar reference numerals are used to designate similar components.

In the drawings, the size of each component and the thicknesses of lines illustrating the components therein are represented for the sake of explanation, and the present disclosure is not limited to what is illustrated in the drawings. For example, in the drawings, the thicknesses of the components may be exaggerated to clearly depict multiple layers and areas.

Furthermore, the expression “being the same” may mean “being substantially the same”. In other words, the expression “being the same” may include a range that can be accepted by those skilled in the art.

FIG. 1 is a diagram illustrating a display device 100 in accordance with an embodiment of the present disclosure.

Referring to FIG. 1, the display device 100 in accordance with an embodiment of the present disclosure may include a pixel component 110, and a pixel driver 200 configured to drive the pixel component 110.

The pixel component 110 may include first to n-th scan lines SL1, SL2, . . . , SLn (n is an integer of 0 or more) and a common control line GC which extend in a first direction, first to m-th data lines DL1, DL2, . . . , DLm (m is an integer of 0 or more) extending in a second direction different from the first direction, and pixels PX.

The pixels PX may be connected to corresponding scan lines among the first to n-th scan lines SL1 to SLn, corresponding data lines among the first to m-th data lines DL1 to DLm, and a common control line GC. As an example, in FIG. 1, there is shown an individual pixel PX connected to an i-th scan line SLi, a j-th data line DLj and the common control line GC. The configuration of this pixel PX will be described with reference to FIG. 3, for example, Each of the pixels PX may be selected when a scan signal is supplied to the corresponding scan line, and may be supplied with a data signal from the corresponding data line. The pixels PX that are supplied with data signals may simultaneously emit light.

The pixel driver 200 may drive the pixel component 110 in a simultaneous emission scheme, e.g., a scheme in which one frame includes a non-emission section in which the pixels PX do not emit light, and an emission section in which the pixels PX simultaneously emit light. To accomplish this, the pixel driver 200 may include a timing controller 120, a scan driver 130, a data driver 140, and a power supply 150.

The timing controller 120 may control the scan driver 130, the data driver 140, and the power supply 150. For example, the timing controller 120 may generate first to third control signals CTL1, CTL2, and CTL3, based on a control signal CTL supplied from an external device (e.g., a system board). Generated from the timing controller 120, the first control signal CTL1 may be supplied to the scan driver 130, the second control signal CTL2 may be supplied to the data driver 140, and the third control signal CTL3 may be supplied to the power supply 150.

The first control signal CTL1 may include a vertical start signal, a scan clock signal, and the like. The second control signal CTL2 may include a horizontal start signal, a sampling signal, a data clock signal, and the like. The third control signal CTL3 may include a switch control signal or the like to control voltage levels of a first power VDD, a second power VSS, and a third power/INT.

The scan driver 130 may generate scan signals and a common control signal in response to the first control signal CTL1 supplied from the timing controller 120, supply the scan signals to the scan lines SL1 to SLn, and supply the common control signal to the common control line GC.

In an embodiment, the scan driver 130 may simultaneously supply scan signals each having a turn-on level to the first to n-th scan lines SL1 to SLn, and thereafter sequentially supply scan signals to the first to n-th scan lines SL1 to SLn. Furthermore, when the scan signals are simultaneously supplied to the first to n-th scan lines SL1 to SLn, the scan driver 130 may supply a common control signal of a turn-on level to the common control line GC such that the scan signal supply period and the common control signal supply period at least partially overlap each other.

In addition, the scan driver 130 may supply scan signals to the scan lines SL1 to SLn during a display scan period of one frame, and may not supply the scan signals to the scan lines SL1 to SLn during another period.

The data driver 140 may generate a data signal in response to the second control signal CTL2 supplied from the timing controller 120. For example, the data driver 140 may generate an analog data signal based on digital data. The data driver 140 may supply data signals to the data lines DL1 to DLm in synchronization with the scan signals that are sequentially supplied to the first to n-th scan lines SL1 to SLn.

The power supply 150 may provide, in response to the third control signal CTL3 supplied from the timing controller 120, the first power VDD, the second power VSS, and the third power VINT each having a voltage level which varies in a cycle of one frame, to the pixels PX. For example, the power supply 150 may include at least one DC-DC converter configured to generate output voltages having various voltage levels based on an input voltage (e.g., a battery voltage), and switches configured to select the output voltages as the first power VDD, the second power VSS, and the third power VINT based on the third control signal CTL3, so as to set respective voltage levels for the first power VDD, the second power VSS, and the third power VINT.

The display device 100 in accordance with an embodiment of the present disclosure may display images at various image refresh rates (or various driving frequencies) depending on driving conditions. An image refresh rate may be a frequency at which data signals are written to the driving transistor of the pixel PX. For example, the image refresh rate may be the number of times per second that images are displayed on a screen.

In an embodiment, the timing controller 120 may control an output frequency of the data driver 140 and/or an output frequency of the scan driver 130 on each horizontal line (or each pixel row) in response to an image refresh rate. For example, the refresh rate for driving a video may be a frequency of approximately 60 Hz or more (e.g., 120 Hz, and 240 Hz).

In an embodiment, the timing controller 120 may control an output frequency of a data signal to be outputted from the data driver 140 and an output frequency of a scan signal to be outputted from the scan driver 130, in response to an image refresh rate. For example, the timing controller 120 may control the output frequencies such that images are displayed in response to various image refresh rates ranging from 1 Hz to 240 Hz. However, the foregoing is only for illustrative purposes. For example, the timing controller 120 may control the output frequencies such that images are displayed at an image refresh rate (e.g., 480 Hz) greater than 240 Hz.

In addition, in an embodiment of the present disclosure, the numbers of non-emission sections and emission sections included in a period of one frame may be set to be different from each other in response to the image refresh rate. For example, as the frequency at which the image refresh rate is set is reduced, the numbers of non-emission sections and emission sections included in one frame period may be increased. As another example, as the frequency at which the image refresh rate is set is increased, the numbers of non-emission sections and emission sections included in one frame period may be decreased.

In addition, the timing controller 120 may use the voltage level of the second voltage VSS outputted from the power supply 150 to control the numbers of non-emission sections and emission sections included in one frame period.

Figure 2:
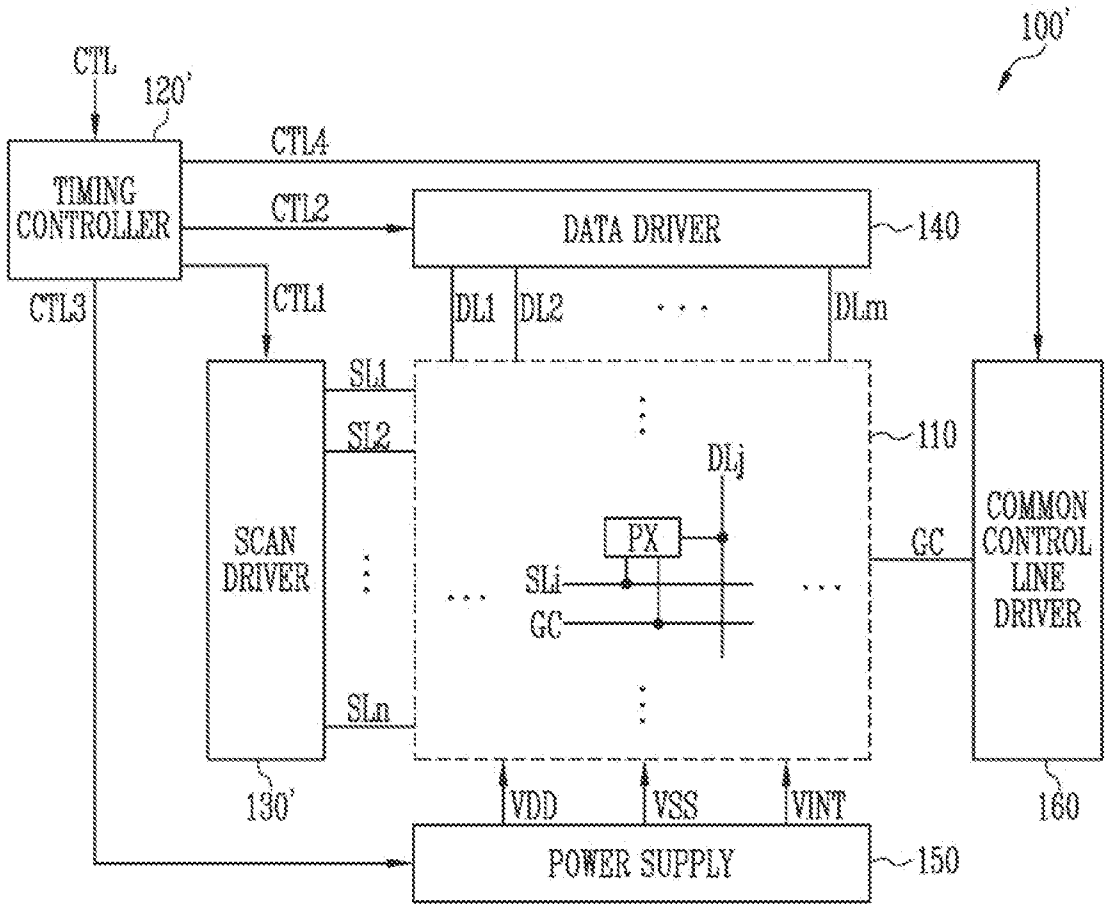
FIG. 2 is a diagram illustrating a display device in accordance with an embodiment of the present disclosure.

FIG. 2 is a diagram illustrating a display device 100' in accordance with an embodiment of the present disclosure. In the following description of FIG. 2, the same reference numerals will be used to designate the same components as those of FIG. 1, and thus, a detailed explanation of the same components may be omitted.

Referring to FIG. 2, the display device 100' in accordance with an embodiment of the present disclosure may include a pixel component 110, and a pixel driver 200' configured to drive the pixel component 110.

The pixel driver 200' may drive the pixel component 110 in a simultaneous emission scheme including a non-emission section in which the pixels PX do not emit light, and an emission section in which the pixels PX simultaneously emit light. To accomplish this, the pixel driver 200' may include a timing controller 120', a scan driver 130', a data driver 140, a power supply 150, and a common control line driver 160.

The timing controller 120' may generate first to fourth control signals CTL1, CTL2, CTL3, and CTL4 based on a control signal CTL. The timing controller 120' may supply the fourth control signal CTL4 to the common control line driver 160. Compared to FIG. 1, the configuration of the timing controller 120', except the additional generation of the fourth control signal CTL4 for the common control line driver 160, is substantially the same as that of FIG. 1.

The scan driver 130' may generate scan signals in response to the first control signal CTL1 supplied from the timing controller 120', and supply the scan signals to the scan lines SL1 to SLn.

In an embodiment, the scan driver 130' may simultaneously supply scan signals each having a turn-on level to the first to n-th scan lines SL1 to SLn, and thereafter sequentially supply scan signals to the first to n-th scan lines SL1 to SLn.

The common control line driver 160 may supply a common control signal to the common control line GC in response to the fourth control signal CTL4 supplied from the timing controller 120'.

In an embodiment, when the scan signals are simultaneously supplied to the first to n-th scan lines SL1 to SLn, the common control line driver 160 may supply a common control signal of a turn-on level to the common control line GC such that the scan signal supply period and the common control signal supply period at least partially overlap each other. Here, the common control line GC may be connected in common to the pixels PX.

The configuration of the display device 100' in accordance with the foregoing embodiment of the present disclosure, except further including the common control line driver 160 configured to drive the common control line GC, is substantially the same as that of the display device 100 of FIG. 1.

Figure 3:
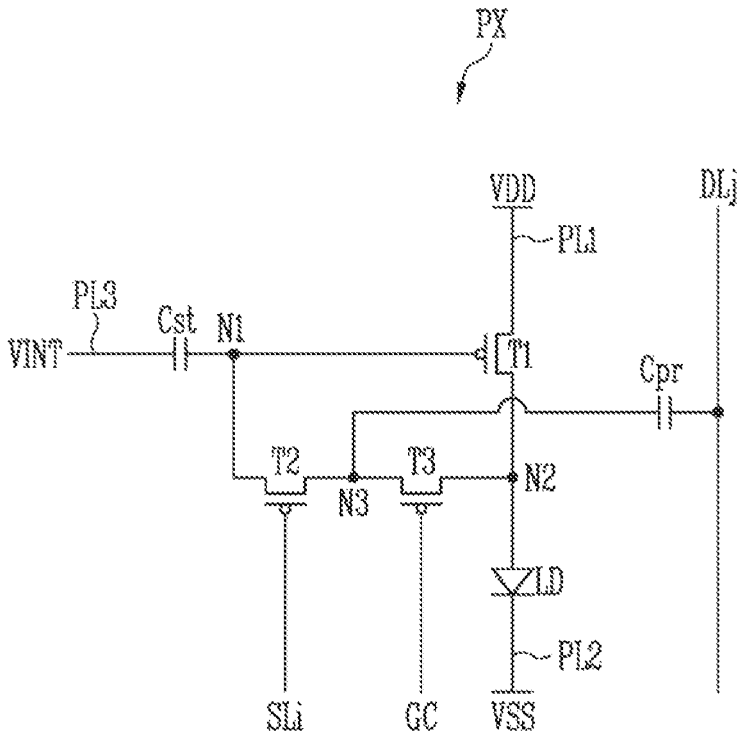
FIG. 3 is a circuit diagram illustrating a pixel in accordance with an embodiment of the present disclosure.

FIG. 3 is a circuit diagram illustrating a pixel in accordance with an embodiment of the present disclosure. For convenience of explanation, FIG. 3 illustrates a pixel PX connected to an i-th scan line SLi (where i is an integer of 0 or more) and a j-th data line DLJ (where j is an integer of 0 or more).

Referring to FIG. 3, the pixel PX in accordance with an embodiment of the present disclosure may include a first capacitor Cpr, a second capacitor Cst, a first transistor T1, a second transistor T2, a third transistor T3, and a light emitting element LD.

Although the first to third transistors T1 to T3 are each illustrated as being formed of a P-type transistor, the present disclosure is not limited thereto. For example, at least one of the first to third transistors T1 to T3 may be an N-type transistor.

The light emitting element LD may be connected between a first power line PL1 to which the first power VDD is to be supplied, and a second power line PL2 to which the second power VSS is to be supplied. For example, a first electrode (e.g., an anode electrode) of the light emitting element LD may be connected to the first power line PL1 via a second node N2 and the first transistor T1. A second electrode (e.g., a cathode electrode) of the light emitting element LD may be connected to the second power line PL2. The light emitting element LD may emit light at a luminance corresponding to a driving current supplied from the first transistor T1, To accomplish this, during an emission section, the voltage of the first power VDD and the voltage of the second power VSS may have a potential difference therebetween to allow the light emitting element LD to emit light.

An organic light emitting diode may be implemented as the light emitting element LD. Furthermore, an inorganic light emitting diode such as a micro light emitting diode (LED) or a quantum dot light emitting diode may be selected as the light emitting element LD. The light emitting element LD may be an element formed of a combination of organic material and inorganic material. Although FIG. 3 illustrates that the pixel PX includes a single light emitting element LD, the pixel PX in an embodiment may include a plurality of light emitting elements. The plurality of light emitting elements may be connected in series, parallel or series-parallel to each other.

A first electrode of the first transistor T1 may be connected to the first power line PL1, and a second electrode of the first transistor T1 may be connected to the second node N2. A gate electrode of the first transistor T1 may be connected to a first node N1. The first transistor T1 may supply a driving current corresponding to the voltage of the first node N1 to the light emitting element LD during the emission section. The first transistor T1 may be referred to as "driving transistor".

A first electrode of the second transistor T2 may be connected to the first node N1, and a second electrode of the second transistor T2 may be connected to a third node N3. A gate electrode of the second transistor T2 may be connected to the i-th scan line SLi. The second transistor T2 may be turned on when a scan signal is supplied to the i-th scan line SLi, and may be turned off in the other cases. If the second transistor T2 is turned on, the first node N1 and the third node N3 may be electrically connected to each other. Here, the words "supply of the scan signal" may refer to the supply of a voltage of a turn-on level.

A first electrode of the third transistor T3 may be connected to the third node N3, and a second electrode of the third transistor T3 may be connected to the second node N2. A gate electrode of the third transistor T3 may be connected to the common control line GC. The third transistor T3 may be turned on when a common control signal is supplied to the common control line GC, and may be turned off in the other cases. If the third transistor T3 is turned on, the third node N3 and the second node N2 may be electrically connected to each other. Here, the words "supply of the common control signal" may refer to the supply of a voltage of a turn-on level.

The first capacitor Cpr may be connected between the third node N3 and the j-th data line DLL The first capacitor Cpr may change the voltage of the third node N3 in response to a change in the voltage of the j-th data line DLj.

The second capacitor Cst is connected between the first node N1 and a third power line PL3 to which the third power VINT is supplied. Here, the third power VINT may be controlled to a voltage level suitable for initializing the pixel PX as an initialization voltage during an initialization section, and may be controlled to a voltage level suitable for supplying a driving current to the light emitting element LD during an emission section. The second capacitor Cst may change the voltage of the first node N1 in response to a change in the voltage of the third power VINT.

Figure 4:
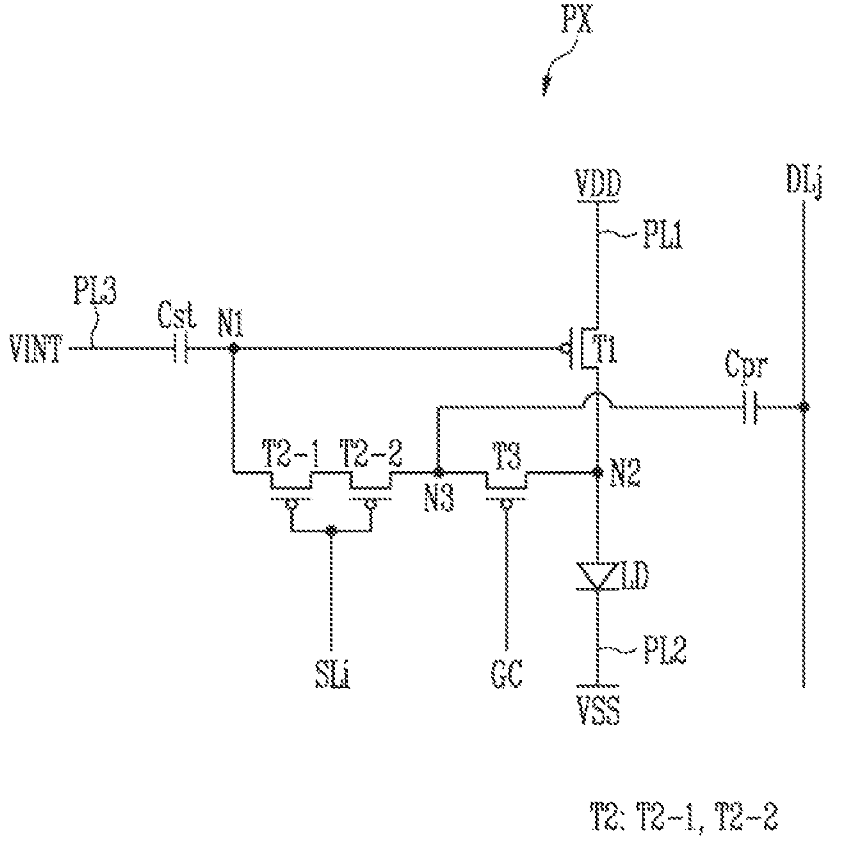
FIG. 4 is a circuit diagram illustrating a pixel in accordance with an embodiment of the present disclosure.

FIG. 4 is a circuit diagram illustrating a pixel in accordance with an embodiment of the present disclosure.

Referring to FIGS. 3 and 4, the pixel PX of FIG. 4, except a configuration in which the second transistor T2 is implemented as a dual-gate transistor, is substantially the same as the pixel PX of FIG. 3, and thus, a redundant explanation thereof will be omitted.

Referring to FIG. 4, the second transistor T2 may include a first sub-transistor T2-1 and a second sub-transistor T2-2. The first sub-transistor T2-1 and the second sub-transistor T2-2 may be connected in series between the first node N1 and the third node N3. A gate electrode of the first sub-transistor T2-1 and a gate electrode of the second sub-transistor T2-2 are connected to the i-th scan line SLi. In the case where the second transistor T2 is formed of a dual-gate transistor, leakage current flowing via the second transistor T2 may be minimized.

Figure 5:
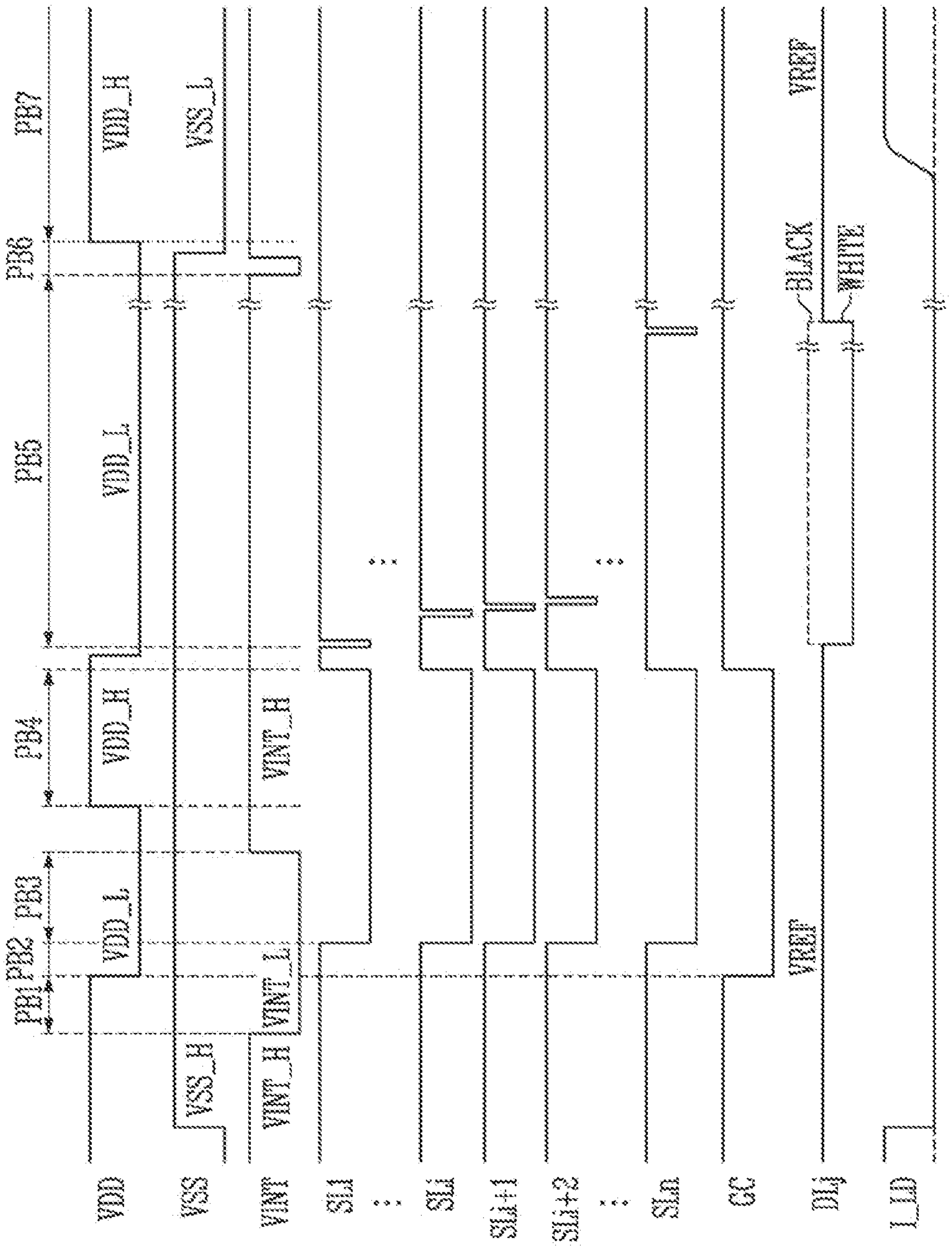
FIG. 5 is a waveform diagram illustrating a method of driving the pixels illustrated in FIGS. 3 and 4.

FIG. 5 is a waveform diagram illustrating a method of driving pixels illustrated in FIGS. 3 and 4. FIG. 5 is a diagram illustrating a waveform to be supplied to a display scan period DSP of one frame.

In an embodiment, the display scan period DSP may be a period in which a voltage of a data signal is stored in each of the pixels PX (e.g., a period in which the pixels PX are supplied with signals for displaying an image), and may be included in one frame period. Hereinafter, for convenience of explanation, a driving method will be described using the display device 100 of FIG. 1.

Referring to FIGS. 1, 3, 4, and 5, the pixel driver 200 may drive the pixel component 110 in a simultaneous emission scheme. In the case where the pixel component 110 is driven in a simultaneous emission scheme, one frame section may include non-emission sections PB1 to PB6 in which the pixels PX do not emit light, and an emission section PB7 in which the pixels PX simultaneously emit light.

The first power VDD, the second power VSS, and the third power VINT each may have a variable voltage level in one frame period. For example, the first power VDD may have a voltage level of a high level VDD_H or a low level VDD_L lower than the high level VDD_H in the one frame period. The second power VSS may have a voltage level of a high level VSS_H or a low level VSS_L lower than the high level VSS_H in the one frame period. The third power VINT may have a voltage level of a high level VINT_H or a low level VINT_L lower than the high level VINT_H in the one frame period. Furthermore, during a data write section PB5, a data signal is supplied to the data line DLJ. During the other sections PB1 to PB4, PB6, and PB7, a voltage of a reference power VREF is supplied to the data line DLJ.

During the non-emission sections PB1 to PB6 of the pixels PX, the second power VSS is set to the high level VSS_H. During the emission section PB7 of the pixels PX, the second power VSS is set to the low level VSS_L. Furthermore, during the emission section PB7 of the pixels PX, the first power VDD is set to the high level VDD_H. In the non-emission sections PB1 to PB6, the high level VSS_H of the second power VSS is set to a high voltage such that the pixels PX do not emit light (e.g., a driving current does not flow through the light emitting element LD), The low level VSS_L of the second power VSS may be set to a voltage lower than the high level VDD_H of the first power VDD such that the pixels PX can emit light during the emission section PB7.

The non-emission sections PB1 to PB6 may include a first initialization section PB1, a second initialization section PB2, a third initialization section PB3, a threshold voltage compensation section PB4, a data write section PB5, and a fourth initialization section PB6.

During the first initialization section PB1, the first power VDD may be set to the high level VDD_H, the second power VSS may be set to the high level VSS_H, and the third power VINT may be set to the low level VINT_L. During the first initialization section PB1, the voltage of the third power line PL3 is changed from the high level VINT_H of the third power VINT to the low level VINT_L of the third power VINT, so that the voltage of the first node N1 also decreases.

During the second initialization section PB2, the first power VDD is changed to the voltage of the low level VDD_L, and a common control signal of a turn-on level is supplied to the common control line GC. If the common control signal is supplied to the common control line GC, the third transistor T3 is turned on. If the third transistor T3 is turned on, the second node N2 and the third node N3 may be electrically connected to each other.

Due to the voltage of the first node N1 that is reduced during the first initialization section PB1, the first transistor T1 is turned on during the second initialization section PB2, If the first transistor T1 is turned on, the voltage of the second node N2 is reduced to a voltage approximately corresponding to the low level VDD_L of the first power VDD. In other words, during the second initialization section PB2, the voltage of the first electrode of the light emitting element LD may be initialized.

During the third initialization section PB3, scan signals are simultaneously supplied to the scan lines SL1 to SLn. If the scan signals are simultaneously supplied to the scan lines SL1 to SLn, the second transistor T2 included in each of the pixels PX ray be turned on. If the second transistor T2 is turned on, the first node N1 may be initialized to a voltage approximately corresponding to the voltage of the second node N2.

During the threshold voltage compensation section PB4, the third power VINT is changed to a voltage of the high level VINT_H, and the first power VDD is changed to a voltage of the high level VDD_H. Because the second transistor T2 and the third transistor T3 each are set to a turn-on state, the first transistor T1 is connected in the form of a diode. If the first transistor T1 is connected in the form of a diode, the voltage of the first node N1 may be set to a voltage obtained by subtracting an absolute value threshold voltage of the first transistor T1 from the high level VDD_H of the first power VDD. In other words, a voltage to be applied to the first node N1 during the threshold voltage compensation section PB4 may be determined by the threshold voltage of the first transistor T1.

During the data write section PB5, the first power VDD is changed to the low level VDD_L. During the data write section PB5, the supply of the common control signal to the common control line GC is interrupted, and scan signals are sequentially supplied to the scan lines SL1 to SLn. If a scan signal is supplied to an i-th scan line SLi, the second transistor T2 is turned on. If the second transistor T2 is turned on, a voltage corresponding to a variation in the voltage of the data line DLj is supplied to the first node N1.

For example, if the data line DLJ is changed from the voltage of the reference power VREF to the voltage of the data signal, a voltage corresponding to the variation in the voltage may be supplied to the first node N1. Here, the reference power VREF is a fixed voltage, and the voltage to be supplied to the first node N1 may be determined by the voltage of the data signal.

During the data write section PB5, the third transistor T3 remains turned off. In this case, the second node N2 and the third node N3 are electrically separated from each other. Therefore, even if leakage current flows from the first transistor T1 to the second node N2 during a period in which the voltage corresponding to the data signal is supplied to the first node N1, the voltage of the first node N1 may not be affected by the leakage current, so that the display quality can be enhanced.

During the data write section PB5, the second transistors T2 that are respectively included in the pixels PX are turned on in units of pixel rows by scan signals which are sequentially supplied to the scan lines SL1 to SLn, so that voltages corresponding to data signals can be supplied to the pixels PX.

During the fourth initialization section PB6, the third power VINT may decrease from the high level VINT_H to the low level VINT_L, and then re-increase to the high level VINT_H. In other words, during the fourth initialization section PB6, the third power VINT may decrease and then re-increase.

Figure 6:
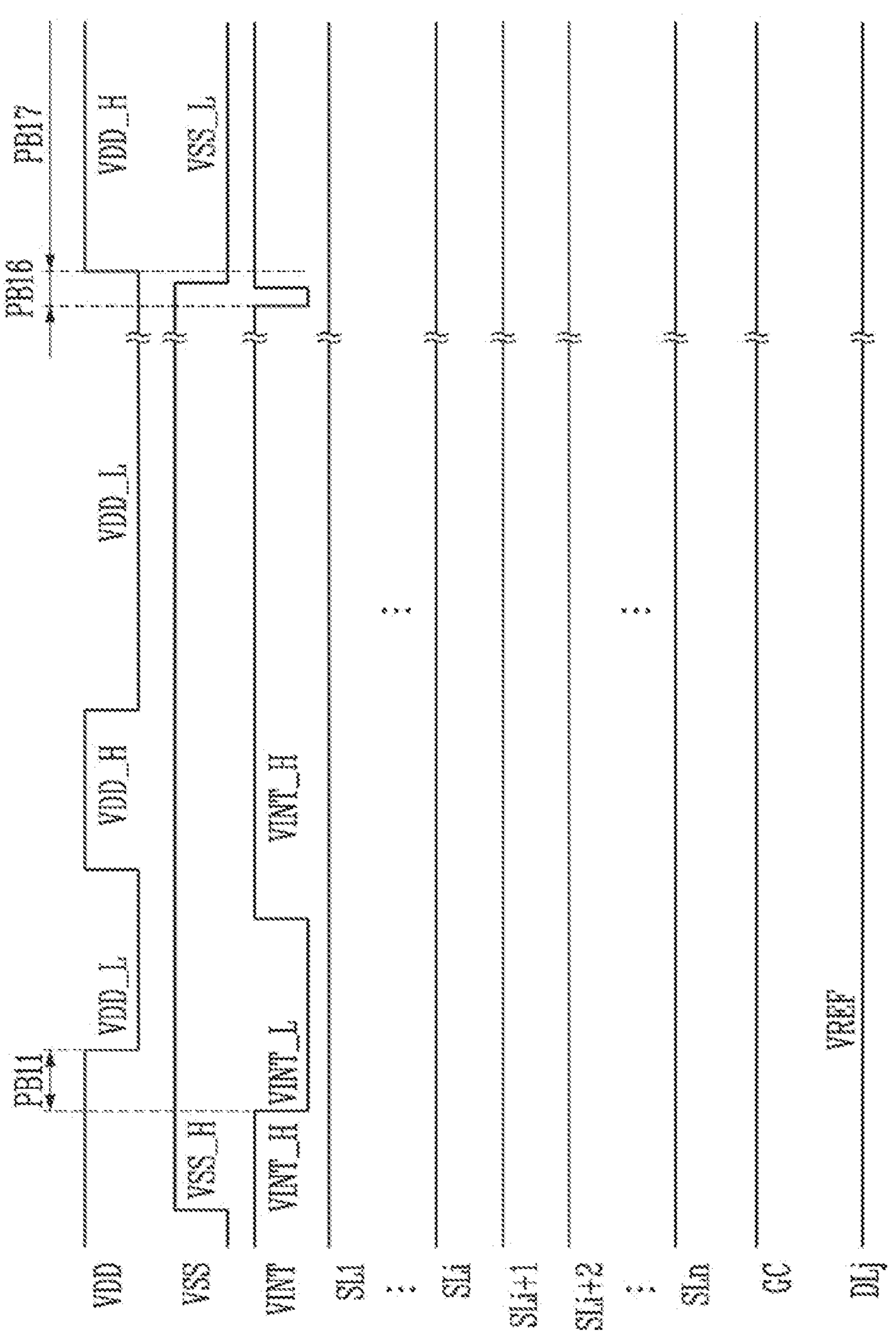
FIG. 6 is a waveform diagram illustrating a method of operating a pixel during a control period of one frame in accordance with an embodiment of the present disclosure.

If the third power VINT decreases to the low level VINT_L, the voltage of the first node N1 decreases, so that the first transistor T1 is turned on. If the first transistor T1 is turned on, the voltage of the second node N2, e.g., a voltage that is charged to a parasitic capacitor of the light emitting element LD, may be discharged via the first power line PL1, In the case where the voltage charged to the parasitic capacitor of the light emitting element LD is discharged, a margin for expressing a black gray scale may be secured, so that the display quality can be enhanced. During the emission section PB7, the first power VDD is set to the high level VDD_H, and the second power VSS is set to the low level VSS_L. Here, the first transistor T1 may supply a driving current I_LD corresponding to the voltage of the first node N1 to the light emitting element LD, so that the light emitting element LD may emit light at a voltage corresponding to the driving current I_LD. Here, because the first power VDD and the second power VSS are supplied in common to the pixels PX, the pixels PX may simultaneously emit light during the emission section PB7, FIG. 6 is a waveform diagram illustrating a method of operating a pixel during a control period of one frame in accordance with an embodiment of the present disclosure. One frame may include at least one control period CP in response to an image refresh rate. In addition, one frame in response to the image refresh rate may include only a display scan period DSP without including the control period CP.

Referring to FIGS. 5 and 6, during the control period CP, the second power VSS may be set to the high level VSS_H or the low level VSS_L. A period during which the second power VSS is set to the high level VSS_H during the control period CP is substantially identical to a period during which the second power VSS is set to the high level VSS_H during the display scan period DSP. In other words, a period during which the pixels PX do not emit light in the display scan period DSP and a period during which the pixels PX do not emit light in the control period CP may be substantially identical to each other. In addition, the period during which the second power VSS is set to the high level VSS_H during the control period CP is set to be different from the period during which the second power VSS is set to the high level VSS_H during the display scan period DSP.

During the control period CP, the first power VDD may be supplied to alternate between the low level VDD_L and the high level VDD_H in the same manner as that of the display scan period DSP. Furthermore, during the control period CP, the third power VINT may be supplied to alternate between the low level VINT_L and the high level VINT_H.

In other words, the first power VDD, the second power VSS, and the third power VINT may be supplied to swing at a constant frequency regardless of the image refresh rate. Hence, the emission sections and the non-emission sections of the pixels PX may be repeated at a certain cycle regardless of the image refresh rate. Here, in the case where the image refresh rate is reduced, the number of swings of the voltage levels of the first power VDD, the second power VSS, and the third power VINT in each frame period may be increased. In the alternative, in the case where the image refresh rate is increased, the number of swings of the voltage levels of the first power VDD, the second power VSS, and the third power VINT in each frame period may be reduced.

During the control period CP, no scan signal is supplied to the scan lines SL1 to SLn, and no common control signal is supplied to the common control line GC. Furthermore, during the control period CP, the voltage of the reference power VREF is supplied to the data line DLJ. Because no scan signal is supplied to the scan lines SL1 to SLn and no control signal is supplied to the common control line GC, the second transistor T2 and the third transistor T3 included in each of the pixels PX during the control period CP may remain turned off. If the second transistor T2 and the third transistor T3 remain turned off, the voltage of a data signal supplied to the first node N1 during a preceding display scan period DSP may be maintained, so that each of the pixels PX can generate light in response to the data signal supplied during the preceding display scan period DSP after the control period CP.

The control period CP may include non-emission sections PB11 and PB16 in which the pixels PX do not emit light, and an emission section PB17 in which the pixels PX emit light. The non-emission sections PB11 and PB16 may include a first initialization section PB11 and a second initialization section PB16.

In the first initialization section PB11, the third power VINT is set to the low level VINT_L. In this case, the voltage of the third power line PO decreases from the high level VINT_H of the third power VINT to the low level VINT_L of the third power VINT, so that the voltage of the first node N1 also decreases.

If the voltage of the first node N1 decreases, the first transistor T1 may be initialized. For example, in the case where the voltage of the first node N1 does not decrease, the gate electrode of the first transistor T1, e.g., the voltage of the first node N1, may be maintained at the same voltage for a relatively long time. If the voltage of the first node N1 is maintained at the same voltage for a relatively long time, the characteristics of the first transistor T1 may vary, whereby the display quality may be reduced. In an embodiment of the present disclosure, the voltage of the gate electrode of the driving transistor T1 may be periodically initialized regardless of the image refresh rate, so that the pixels PX may represent uniform luminance characteristics in response to various image refresh rates (e.g., low frequency driving).

During the second initialization section PB16, the third power VINT may decrease from the high level VINT_H to the low level VINT_L, and then re-increase to the high level VINT_H. In other words, during the second initialization section PB16, the third power VINT may decrease and re-increase.

If the third power VINT decreases to the low level VINT_L, the voltage of the first node N1 decreases, so that the first transistor T1 is turned on. If the first transistor T1 is turned on, the voltage of the second node N2, e.g., a voltage that is charged to a parasitic capacitor of the light emitting element LD, may be discharged via the first power line PL1. In an embodiment of the present disclosure, the first electrode of the light emitting element LD may be periodically initialized regardless of the image refresh rate, so that the pixels PX may represent uniform luminance characteristics in response to various image refresh rates (e.g., low frequency driving).

During the emission section PB17, the first power VDD is set to the high level VDD_H, and the second power VSS is set to the low level VSS_L. Here, the first transistor T1 may supply a driving current corresponding to the voltage of the first node N1 to the light emitting element LD, so that the light emitting element LD may emit light at a voltage corresponding to the driving current. Here, because the first power VDD and the second power VSS are supplied in common to the pixels PX, the pixels PX may simultaneously emit light during the emission section PB17.

Figure 7:
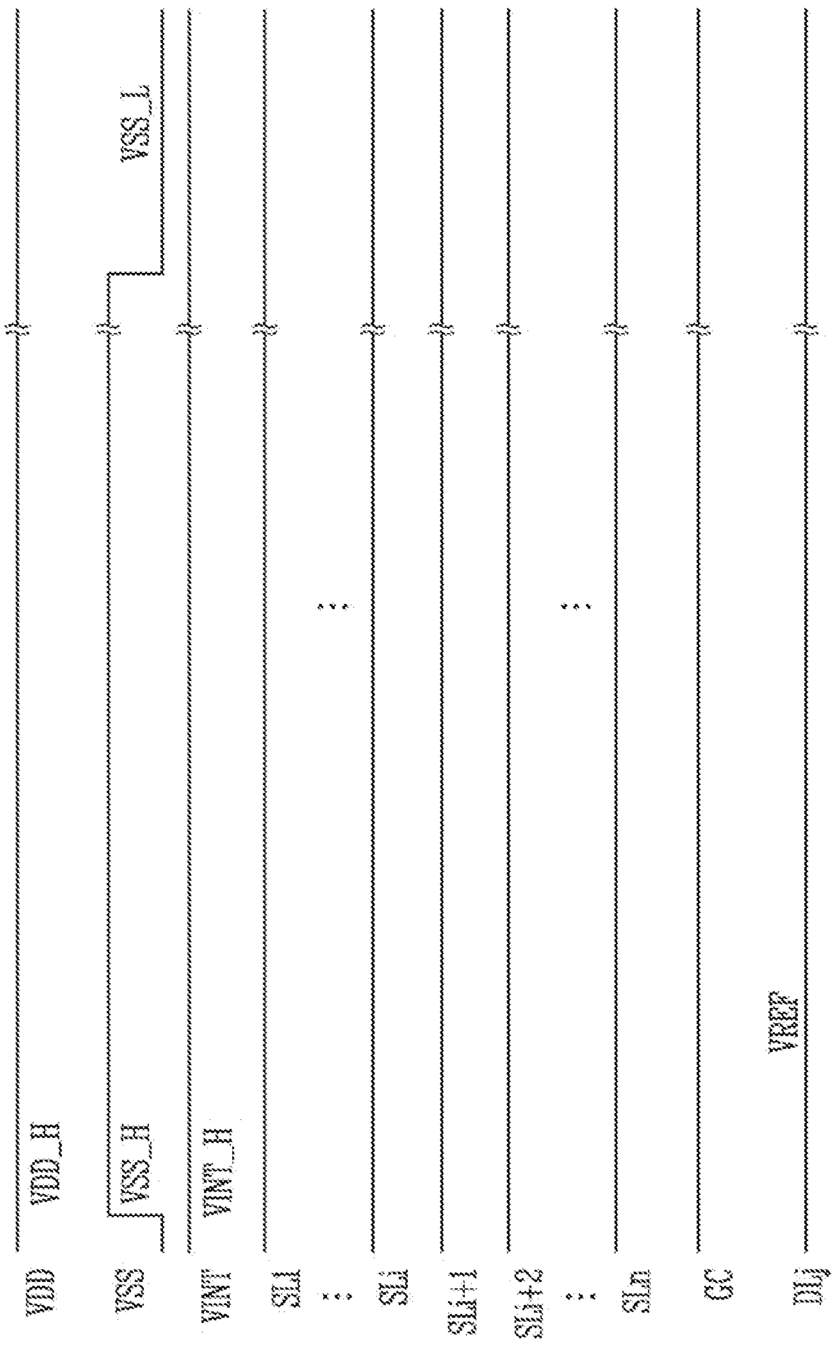
FIG. 7 is a waveform diagram illustrating a method of operating a pixel during a control period of one frame in accordance with an embodiment of the present disclosure.

FIG. 7 is a waveform diagram illustrating a method of operating the pixel during a control period of one frame in accordance with an embodiment of the present disclosure. In the following description of FIG. 7, redundant explanations pertaining to the same waveforms as that of FIG. 6 will be omitted.

Referring to FIG. 7, in an embodiment of the present disclosure, during the control period CP, the first power VDD may be maintained at the high level VDD_H, and the third power VINT may also be maintained at the high level VINT_H.

Furthermore, during the control period CP, the second power VSS may be set to the high level VSS_H and the low level VINT_L. A period during which the second power VSS is set to the high level VSS_H during the control period CP may be substantially identical to a period during which the second power VSS is set to the high level VSS_H during the display scan period DSP. During the control period CP the first power VDD may be supplied to alternate between the low level VDD_L and the high level VDD_H in the same manner as that of the display scan period DSP.

Figure 8:
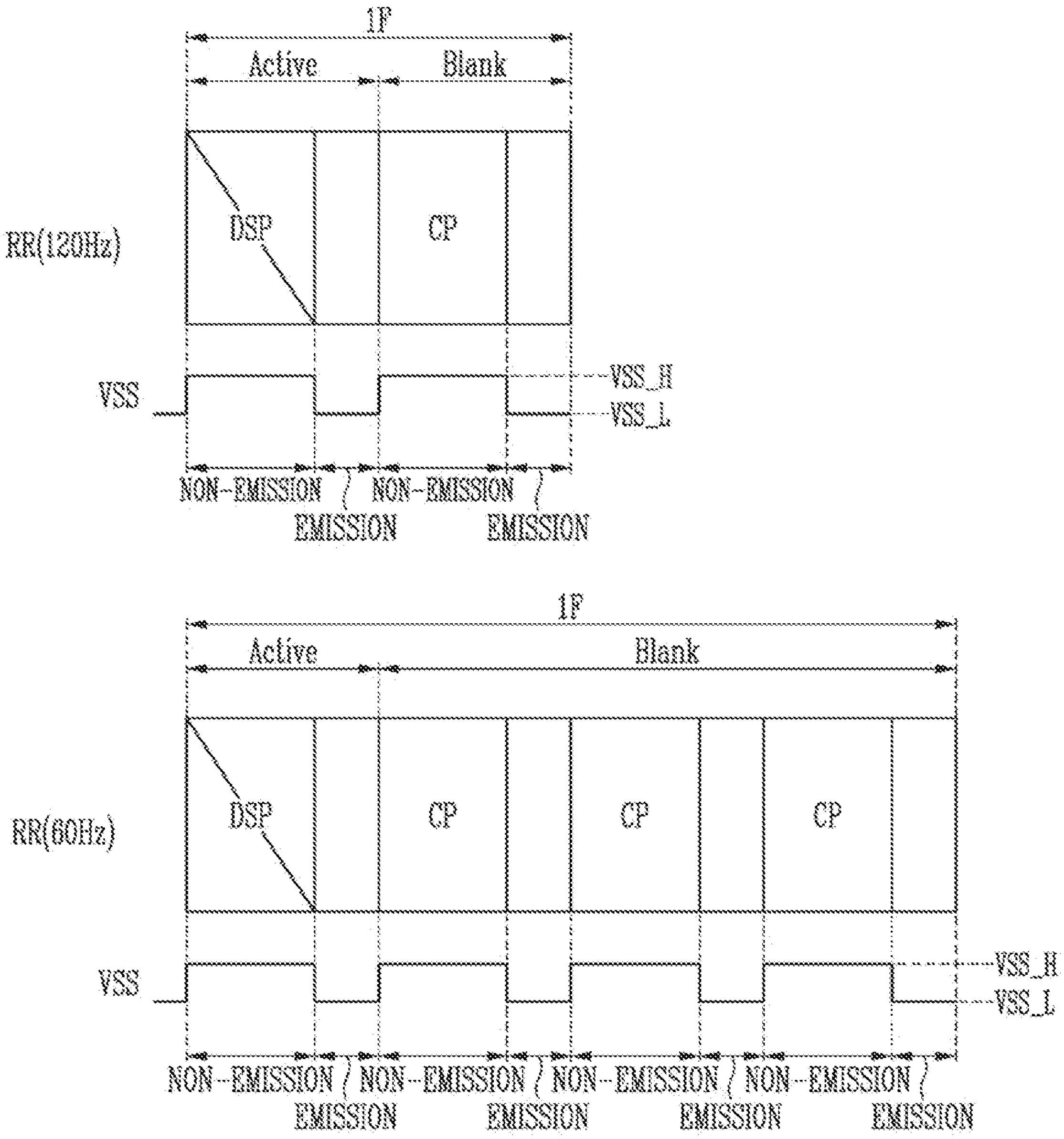
FIGS. 8 and 9 are diagrams for describing a display method of the display device according to an image refresh rate.
Figure 9:
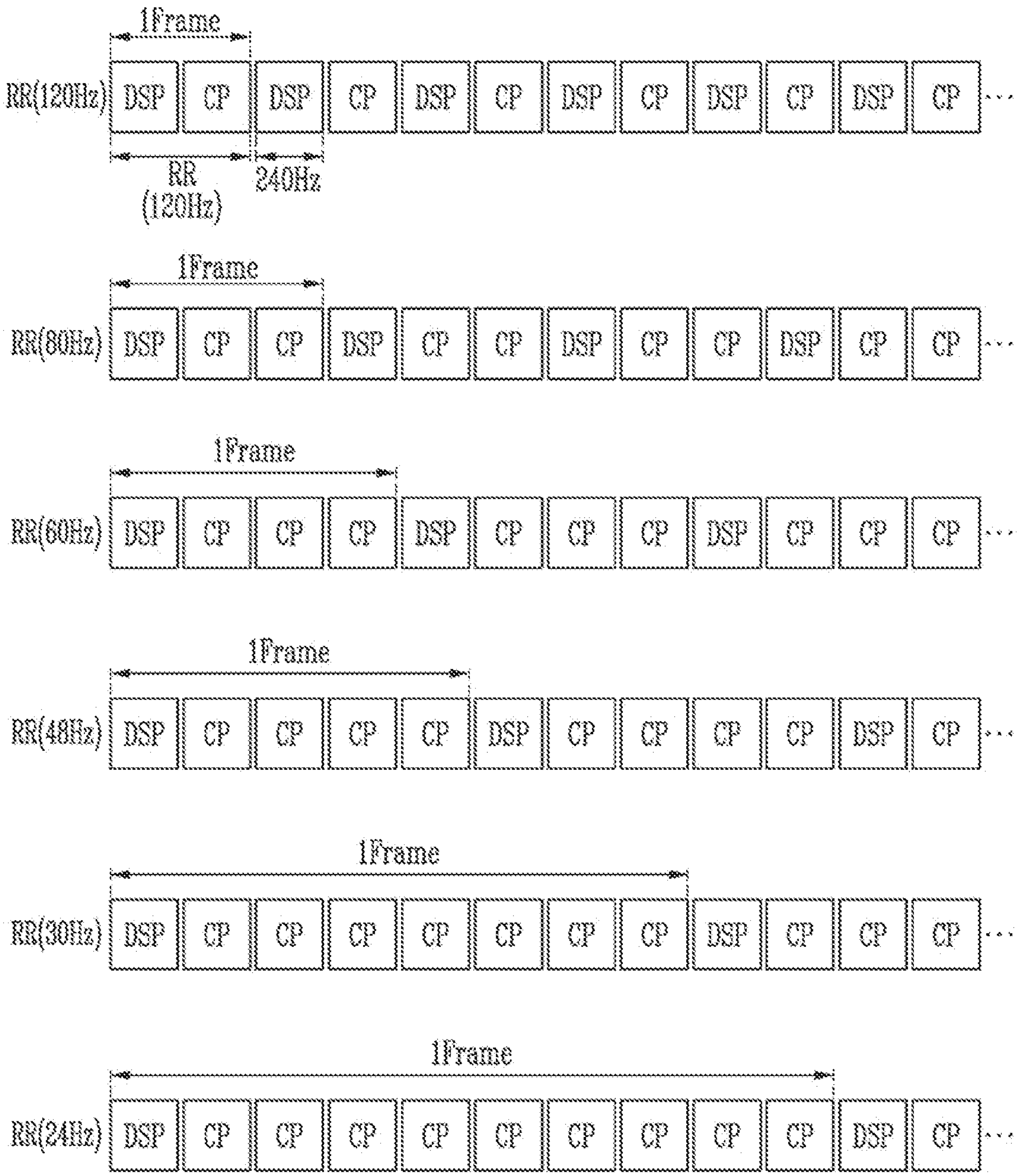

FIGS. 8 and 9 are diagrams for describing a display method of the display device according to an image refresh rate.

Referring to FIGS. 8 and 9, the period of one frame 1F in response to the image refresh rate may be changed. In FIGS. 8 and 9, RR may refer to the image refresh rate. For example, in the case where the image refresh rate is set to 60 Hz, one frame 1F may be outputted every approximately 16.67 ms. In the case where the image refresh rate is set to 120 Hz, one frame 1F may be outputted every approximately 8.33 s. In other words, the width (e.g., the length or time) of one frame 1F may vary in response to the image refresh rate. For example, one frame 1F of 60 Hz may have a width (or time) approximately two times that of one frame 1F of 120 Hz.

One frame 1F may include an active section and a blank section. The active section may be a period in which a data signal is supplied, and may be set to have a constant width (or time) in a period of one frame regardless of the image refresh rate. The blank section may refer to a period other than the active section, and may be a period in which no data signal is supplied. The width (or time) of the blank section may be set to vary in response to the image refresh rate.

For example, in the case where the image refresh rate is 60 Hz, the blank section may have a width three times that of the case where the image refresh rate is 120 Hz. In other words, in an embodiment of the present disclosure, the width of the blank section may be controlled in response to a change in the image refresh rate so that images can be displayed at a frequency ranging from a high frequency or a low frequency. Furthermore, in the present disclosure, images can be displayed by controlling the number of control periods CP included in one frame in response to the width of the blank section.

As illustrated in FIGS. 8 and 9, in the case where the display device 100 is driven at an image refresh rate of 120 Hz, one frame period may include one display scan period DSP and one control period CP Hence, in the case where the display device 100 is driven at an image refresh rate of 120 Hz, the pixels PX each may alternately repeat an emission operation and a non-emission operation two times during one frame period.

In the case where the display device 100 is driven at an image refresh rate of 80 Hz, one frame period may include one display scan period DSP and two control periods CR Hence, in the case where the display device 100 is driven at an image refresh rate of 80 Hz, the pixels PX each may alternately repeat an emission operation and a non-emission operation three times during one frame period.

In the case where the display device 100 is driven at an image refresh rate of 60 Hz, one frame period may include one display scan period DSP and three control periods CR Hence, in the case where the display device 100 is driven at an image refresh rate of 60 Hz, the pixels PX each may alternately repeat an emission operation and a non-emission operation four times during one frame period.

In a manner similar to the foregoing, the display device 100 may be driven at a driving frequency of 48 Hz, 30 Hz, 24 Hz, 1 Hz, or the like by adjusting the number of control periods CP included in one frame. For example, in the case where the display device 100 is driven at an image refresh rate of 48 Hz, one frame period may include one display scan period DSP and four control periods CR Hence, in the case where the display device 100 is driven at an image refresh rate of 48 Hz, the pixels PX each may alternately repeat an emission operation and a non-emission operation five times during one frame period.

In other words, in an embodiment of the present disclosure, as the image refresh rate (e.g., the driving frequency) is reduced, the number of control periods CP included in one frame is increased. Hence, the pixels PX may emit light at a preset cycle regardless of the image refresh rate, so that a flicker phenomenon or the like can be prevented from occurring when the image refresh rate varies.

In addition, although in the description of FIG. 8 the image refresh rate has been described as being 120 Hz or 60 Hz, the present disclosure is not limited thereto. For example, 120 Hz may be changed to 60 Hz, and 60 Hz may be changed to 30 Hz. In other words, the number of control periods CP included in one frame may be changed in various ways in response to the image refresh rate, FIG. 10 is a diagram illustrating the result of a simulation in accordance with an embodiment of the present disclosure.

Figure 10:
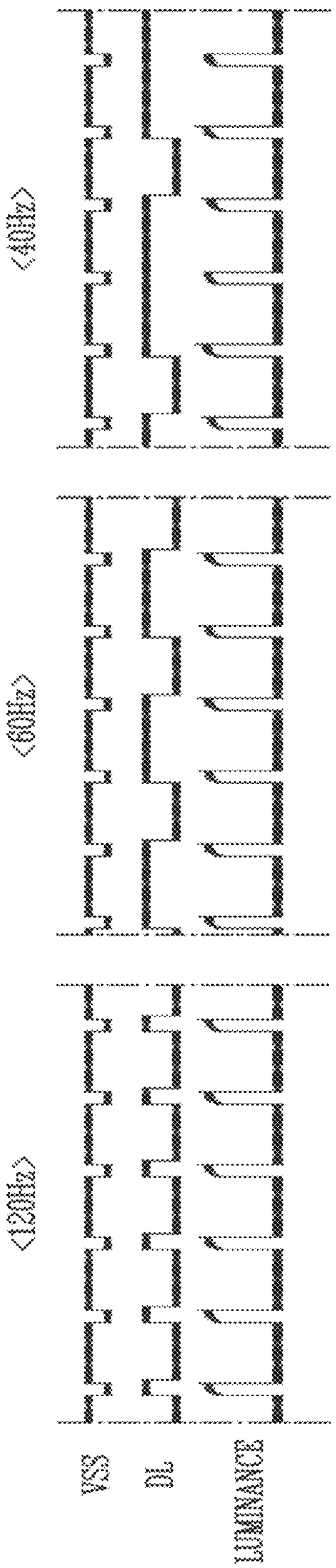
FIG. 10 is a diagram illustrating a result of a simulation in accordance with an embodiment of the present disclosure.

Referring to FIG. 10, in an embodiment of the present disclosure, the pixels PX may emit light at a set cycle regardless of the image refresh rate of 120 Hz, 60 Hz and 40 Hz. As such, if the pixels PX emit light at a set cycle regardless of the image refresh rate, an image having a uniform luminance (LUMINANCE) can be displayed.

Figure 11:
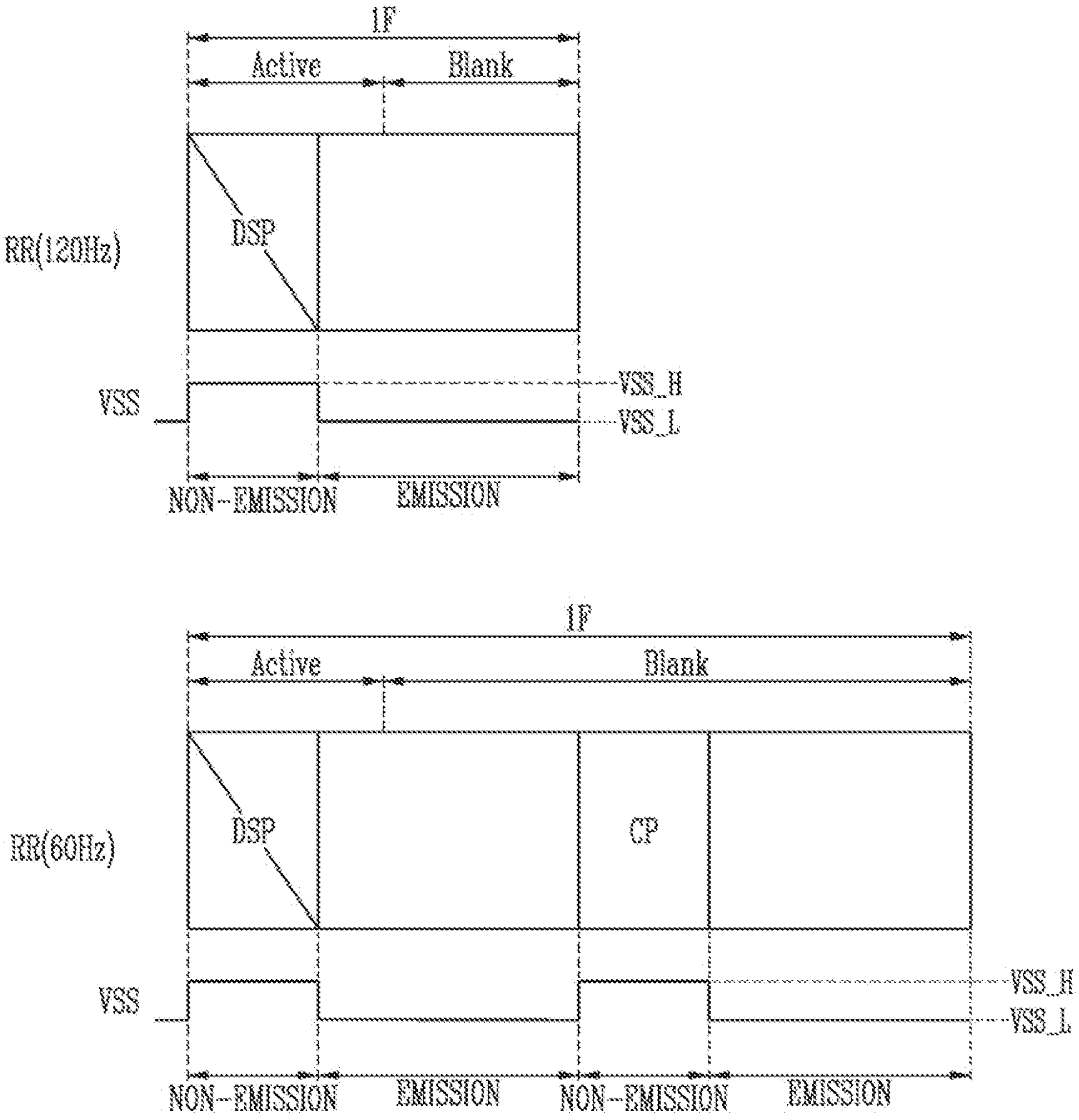
FIG. 11 is a view for describing a display method of the display device according to an image refresh rate in accordance with an embodiment of the present disclosure.

FIG. 11 is a view for describing another embodiment of a display method of the display device according to an image refresh rate. In the following description of FIG. 11, a redundant explanation pertaining to the same waveforms as that of FIG. 8 will be omitted.

Referring to FIG. 11, the active section in one frame 1F is set to be the same regardless of the image refresh rate, and the width (or time) of the blank section may be set to vary depending on the image refresh rate.

Here, the number of control periods CP included in the blank section may be set to various values. For example, in the case where the display device 100 is driven at an image refresh rate of 120 Hz, one frame period may include only one display scan period DSP. In this case, the emission time may be longer than that of the case of FIG. 8.

Furthermore, in the case where the display device 100 is driven at are image refresh rate of 60 Hz, one frame period may include one display scan period DSP and one control period CP. Hence, in the case where the display device 100 is driven at an image refresh rate of 60 Hz, each of the pixels PX may alternately repeat an emission operation and a non-emission operation two times during one frame period.

The case of FIG. 11 is different, only in the number of control periods CP included in one frame 1F, from the case of FIG. 8, and the driving method thereof is substantially the same as that of FIG. 8. In other words, in the case of FIG. 11, the pixels PX may also emit light at a constant cycle in response to a change in the image refresh rate, so that an image having a uniform luminance can be displayed.

Figure 12A:
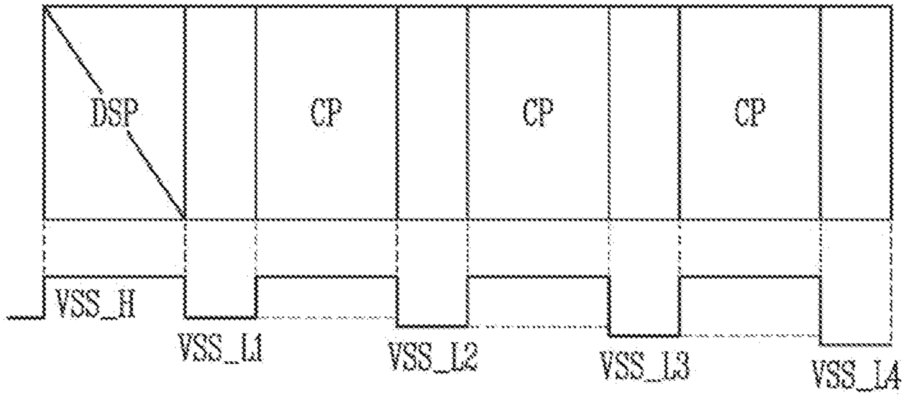
FIGS. 12A and 12B are diagrams illustrating a voltage level of a second power to be supplied during a control period, in accordance with an embodiment of the present disclosure.
Figure 12B:
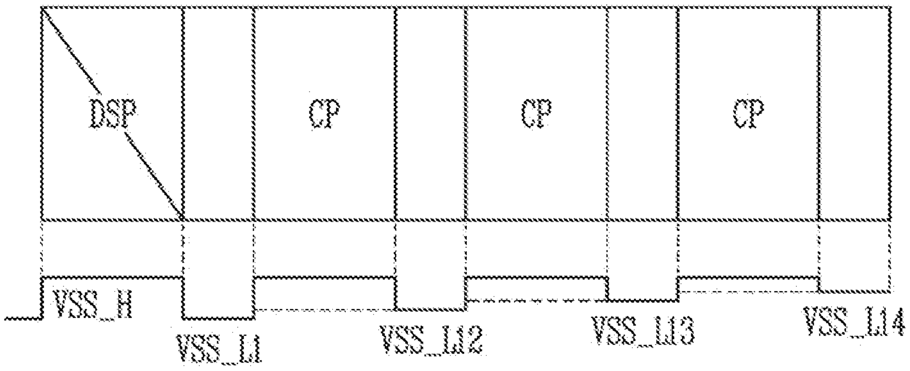

FIGS. 12A and 12B are diagrams illustrating a voltage level of the second power to be supplied during a control period, in accordance with an embodiment of the present disclosure.

Referring to FIGS. 12A and 12B, one frame period may include one display scan period DSP and one or more control periods CP depending on the image refresh rate. Here, as the image refresh rate becomes closer to a low frequency, the period of one frame becomes longer. Hence, the number of control periods CP included in the one frame may be increased.

In the case where the period of one frame becomes longer, a leakage current may occur on the first node N1 of FIG. 3, and the luminance of the pixel PX may be increased or reduced in response to the leakage current. For example, in the case that the voltage of the first node N1 increases in response to the leakage current, when the driving transistor a P-type transistor, the luminance may be reduced, and when the driving transistor is an N-type transistor, the luminance may be increased.

In an embodiment of the present disclosure, the voltage of the second power VSS may be controlled during the emission section after the control period CP such that light having a desired luminance can be generated from the pixel PX regardless of a leakage current.

For example, as illustrated in FIG. 12A, the second power VSS may be set to a voltage of a first low level VSS_L1 during an emission section after the display scan period DSP, and the second power VSS may be set to a second low level VSS_L2 different from the first low level VSS_L1 during an emission section after a first control period CP Furthermore, the second power VSS may be set to a third low level VSS_L3 different from the second low level VSS_L2 during an emission section after a second control period CP The second power VSS may be set to a fourth low level VSS_L4 different from the third low level VSS_L3 during the emission section after a third control period CP In other words, in the case of FIG. 12A, the voltage of the second power VSS may be controlled to be reduced in an emission section after each control period CP so that the luminance can be compensated for in response to leakage current.

Furthermore, as illustrated in FIG. 12B, the second power VSS may be set to a voltage of a first low level VSS_L1 during an emission section after the display scan period DSP, and the second power VSS may be set to a second low level VSS_L12 different from the first low level VSS_L1 during an emission section after a first control period CP Furthermore, the second power VSS may be set to a third low level VSS_L13 different from the second low level VSS_L12 during an emission section after a second control period CP The second power VSS may be set to a fourth low level VSS_L14 different from the third low level VSS_L13 during an emission section after a third control period CP In other words, in the case of FIG. 12B, the voltage of the second power VSS may be controlled to be increased in an emission section after each control period CP so that the luminance can be compensated for in response to leakage current.

Figure 13A:
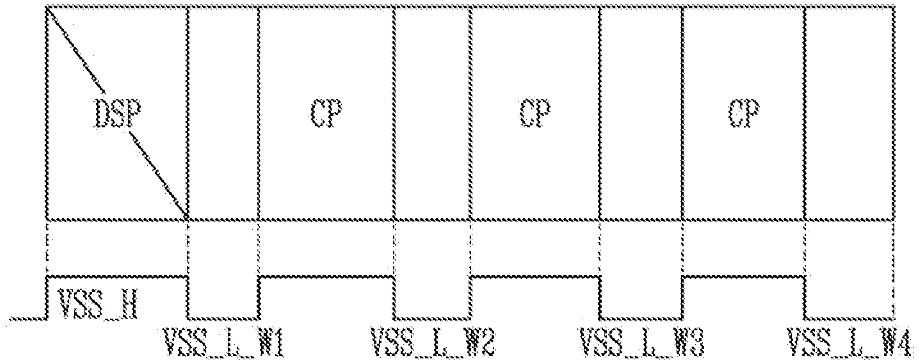
FIGS. 13A and 13B are diagrams illustrating a supply time of a second power to be supplied during a control period, in accordance with an embodiment of the present disclosure.
Figure 13B:
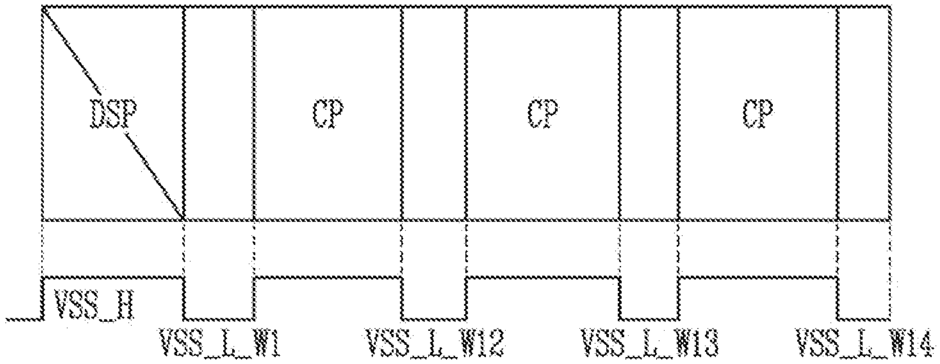

FIGS. 13A and 13B are diagrams illustrating a supply time of the second power to be supplied during a control period, in accordance with an embodiment of the present disclosure.

Referring to FIGS. 13A and 13B, one frame period may include one display scan period DSP and one or more control periods CP depending on the image refresh rate. Here, as the image refresh rate becomes closer to a low frequency, the period of one frame becomes longer. Hence, the number of control periods CP included in the one frame may be increased.

In the case where the period of one frame increases, a desired gray scale may not be attained due to leakage current from the gate electrode of the driving transistor (e.g., the first transistor T1 in FIGS. 3 and/or 4). In an embodiment of the present disclosure, the width of the emission section after the control period CP can be controlled such that a desired gray scale in the pixel PX can be attained regardless of the leakage current.

For example, as illustrated in FIG. 13A, during an emission section after the display scan period DSP, a voltage of the second power VSS that has a first low level VSS_L_W1 and a first width W1 may be supplied. During an emission section after a first control period CP, a voltage of the second power VSS that has a second low level VSS_L_W2 and a second width W2 may be supplied. Furthermore, during an emission section after a second control period CP, a voltage of the second power VSS that has a third low level VSS_L_W3 and a third width W3 may be supplied. During an emission section after a third control period CP, a voltage of the second power VSS that has a fourth low level VSS_L_W4 and a fourth width W4 may be supplied. Here, the first width W1, the second width W2, the third width W3, and the fourth width W4 may be set to different widths (or periods or times). For example, the first width W1, the second width W2, the third width W3, and the fourth width W4 may be set such that the lengths (or widths or times) thereof are increased in the order listed above. In other words, the fourth width W4 may be the largest width of the first to fourth widths W1 to W4.

In the case where as illustrated in FIG. 13A the supply width (or time) of the second power VSS of the low level VSS_L varies, the width of the emission sections may be changed. In other words, in FIG. 13A, the width of the emission sections may gradually increase such that the luminance can be compensated for in response to a leakage current.

For example, as illustrated in FIG. 13B, during an emission section after the display scan period DSP, a voltage of the second power VSS that has a first low level VSS_L_W1 and a first width W1 may be supplied. During an emission section after a first control period CP, a voltage of the second power VSS that has a second low level VSS_L_W12 and a second width W12 may be supplied. Furthermore, during an emission section after a second control period CP, a voltage of the second power VSS that has a third low level VSS_L_W13 and a third width W13 may be supplied. During an emission section after a third control period CP, a voltage of the second power VSS that has a fourth low level VSS_L_W14 and a fourth width W14 may be supplied. Here, the first width W1, the second width W12, the third width W13, and the fourth width W14 may be set to different widths (or periods or times). For example, the first width W1, the second width W12, the third width W13, and the fourth width W14 may be set such that the lengths (or widths or times) thereof are reduced in the order listed above. In other words, the fourth width W14 may be the smallest width of the first to fourth widths W1 to W14.

In the case where as illustrated in FIG. 13B the supply width (or time) of the second power VSS of the low level VSS_L varies, the width of the emission section may be changed. In other words, in FIG. 133, the width of the emission section may gradually reduce such that the luminance can be compensated for in response to a leakage current.

In a display device and a method of driving the display device in accordance with embodiments of the present disclosure, pixels may emit light at a constant cycle regardless of an image refresh rate, so that a flicker or the like can be prevented.

Furthermore, in various embodiments of the present disclosure, a voltage and/or width (or a supply time) of a second power may be controlled based on an image refresh rate, so that an image having a uniform luminance can be displayed regardless of a leakage current of a driving transistor.

However, effects of the present disclosure are not limited to the above-described effects, and various modifications of the embodiments of the present disclosure are possible without departing from the spirit and scope of the present disclosure.

While embodiments of the present disclosure have been described above, those skilled in the art will appreciate that various modifications, additions and substitutions are possible, without departing from the scope and spirit of the present disclosure as set forth in the appended claims

What is claimed is:

1. A display device, comprising:

a power supply configured to supply a first power, a second power, and a third power to a first power line, a second power line, and a third power line, respectively, wherein each of the first power, the second power and the third power varies in voltage level during one frame period; and pixels connected to at least one of scan lines and data lines, and connected to a common control line that is configured to supply common control signals, the first power line, the second power line, and the third power line, wherein the pixels simultaneously emit light when the second power is changed to a low level, and a number of times the second power is changed to the low level during the one frame period changes in response to an image refresh rate, wherein the one frame period corresponds to a period between two consecutive common control signals, wherein the third power is for initializing the pixels, wherein the number of times the second power is changed to the low level between the two consecutive common control signals is a first value that is greater than or equal to 1 when the image refresh rate is a first rate, and a second value greater than the first value when the image refresh rate is a second rate lower than the first rate, wherein each of the pixels comprises a driving transistor configured to control a current to be supplied to a light emitting element, and wherein the one frame period includes a display scan period, the display scan period including: a first non-emission section including a first initialization section in which the driving transistor is initialized, a second initialization section in which an anode electrode of the light emitting element is initialized, a threshold voltage compensation section in which a threshold voltage of the driving transistor is compensated for, and a data write section in which a data signal is written in the pixels; a third initialization section in which the second power changes from a high level to the low level, and the third power changes from a high level to a low level and back to the high level; and a first emission section in which the pixels simultaneously emit light, and wherein the power supply is further configured to gradually increase the low level of the second power when the number of times the second power is changed to the low level is the second value greater than the first value.

2. The display device according to claim 1, wherein, as the image refresh rate is reduced, the number of times the second power is changed to the low level is increased.

3. The display device according to claim 1, wherein the one frame period includes at least one control period in response to a frequency of the image refresh rate, wherein the at least one control period comprises: a second non-emission section in which the pixels do not emit light; and a second emission section in which the pixels simultaneously emit light.

4. The display device according to claim 3, wherein, when the image refresh rate is reduced, a number of control periods included in the one frame period is increased.

5. The display device according to claim 1, wherein each of the pixels comprises:

the light emitting element connected between a second node and the second power line;

the driving transistor connected between the first power line and the second node, and including a gate electrode connected to a first node;

a second capacitor connected between the third power line and the first node;

a second transistor connected between the first node and the second node, and including a gate electrode connected to an i-th scan line (where is a natural number);

a third transistor connected between a third node and the second node, and including a gate electrode connected to the common control line; and a first capacitor connected between the third node and a j-th scan line (where j is a natural number).

6. A method of driving a display device in which pixels are driven during one frame period using a voltage level of a second power supplied to a cathode electrode of a light emitting element included in each of the pixels, the method comprising:

writing a voltage of a data signal in each of the pixels during a first non-emission section of a display scan period of the one frame period, the one frame period corresponding to a period between two consecutive common control signals, and simultaneously emitting light from the pixels during a first emission section of the one frame period; and maintaining the voltage of the data signal supplied during the first non-emission section of the display scan period in at least one second non-emission section corresponding to at least one control period of a blank period of the one frame period that occurs after the display scan period, and simultaneously emitting light from the pixels during at least one second emission section of the blank period of the one frame period that occurs alternately with the at least one control period, wherein a number of control periods between the two consecutive common control signals is a first value that is greater than or equal to 1 when the display device is driven at a first image refresh rate and a second value greater than the first value when the display device is driven at a second image refresh rate that is lower than the first image refresh rate, wherein the at least one control period includes a first initialization section in which a driving transistor is initialized, and a second initialization section in which the second power changes from a voltage of a high level to the voltage of a low level and a third power supplied to a third power line changes from a voltage of a high level to the voltage of a low level and back to the high level, wherein during each of a first emission section of the display scan period and a second emission section of the at least one control period, the second power is set to the voltage of the low level, and wherein the low level voltage of the second power supplied is set to gradually increase when the number of control periods between the two consecutive common control signals is the second value greater than the first value.

7. The method according to claim 6, wherein the number of control periods included in the one frame period is changed in response to an image refresh rate.

8. The method according to claim 7, wherein, in a case where the image refresh rate is reduced, the number of control periods included in the one frame period is increased.

9. The method according to claim 6, wherein the low level voltage of the second power supplied during the second emission section of the at least one control period is set to be different from the low level voltage of the second power supplied during the first emission section of the display scan period.

10. A display device, comprising:

a power supply configured to supply a first power, a second power, and a third power to a first power line, a second power line, and a third power line, respectively, wherein each of the first power, the second power and the third power varies in voltage level during one frame period; and pixels connected to at least one of scan lines and data lines, and connected to a common control line that is configured to supply common control signals, the first power line, the second power line, and the third power line, wherein the one frame period corresponds to a period between two consecutive common control signals, wherein the pixels simultaneously emit light when the second power is changed to a low level after at least one control period within the one frame period, and a number of the at least one control period in the one frame period is a first value that is greater than or equal to 1 when an image refresh rate is a first rate, and a second value greater than the first value when the image refresh rate is a second rate lower than the first rate, wherein the third power is for initializing the pixels, wherein each of the pixels comprises a driving transistor configured to control a current to be supplied to a light emitting element, and wherein the one frame period includes a display scan period, the display scan period including: a first non-emission section including a first initialization section in which the driving transistor is initialized, a second initialization section in which an anode electrode of the light emitting element is initialized, a threshold voltage compensation section in which a threshold voltage of the driving transistor is compensated for, and a data write section in which a data signal is written in the pixels; a third initialization section in which the second power changes from a high level to the low level, and the third power changes from a high level to a low level and back to the high level; and a first emission section in which the pixels simultaneously emit light, and wherein the low level of the second power supplied is set to gradually increase when the number of the at least one control period is the second value greater than the first value.

11. The display device of claim 10, wherein, when the image refresh rate is reduced, a number of control periods included in the one frame period is increased.

* * * * *